United States Patent Office 3,560,034
Patented Feb. 2, 1971

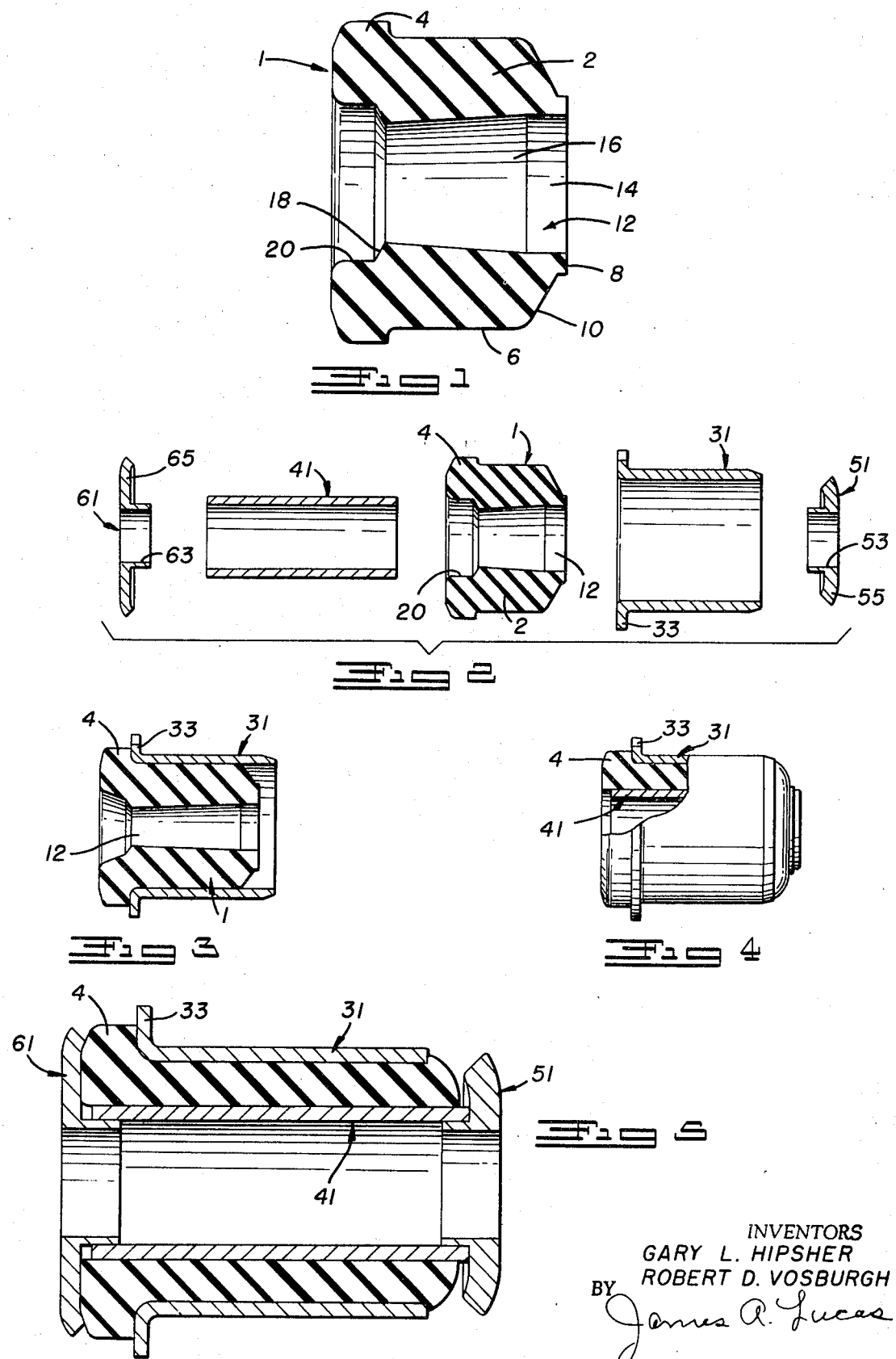

3,560,034
FLANGED-END BUSHING
Gary L. Hipsher, Logansport, Ind., and Robert D. Vosburgh, Utica, Mich., assignors to The General Tire & Rubber Company, a corporation of Ohio
Continuation of application Ser. No. 732,365, May 27, 1968. This application May 28, 1969, Ser. No. 828,599
Int. Cl. F16f 1/38
U.S. Cl. 287—85                                6 Claims

ABSTRACT OF THE DISCLOSURE

An improved flanged-end resilient bushing of the type used, for example, as an isolation mounting in automobile suspensions, comprises an annular elastomeric insert radially compressed between a pair of rigid concentric sleeves. The elastomeric insert is composed of a flange and a body portion. Longer bushing life is achieved by molding the insert with the bore through the body portion having at least about a 2° taper, extending from a smaller diameter at the junction with the flange to a larger diameter at the free end of the body portion opposite the flange.

BACKGROUND OF THE INVENTION

This application is a continuation application of U.S. patent application Ser. No. 732,365, now abandoned.

Bushings of the type herein described have been used for many years to provide a yieldable connection between two relatively movable parts. The earlier bushings were made by inserting an uncured rubber stock between a pair of metal sleeves and then vulcanizing the rubber to form a permanent bond with both of the sleeves. During vulcanization, most of the internal stresses within the rubber were relieved. This type of bushing worked reasonably well under small loads and minimum rotation or oscillatory deflection.

A later improvement in this type of bushing involved molding and curing the elastomeric insert prior to assembly of the bushing, the wall thickness of the rubber being considerably greater than the space between the inner and outer metal sleeves. During assembly, the rubber insert would be radially compressed by as much as 40 to 60 percent, and this compression would cause the insert to undergo axial elongation. The rubber thus held under compression would exert a force of several hundred pounds per square inch against the sleeves. This great amount of pressure would cause the rubber to frictionally adhere to the contiguous metal surfaces and would permit the outer sleeve to rotate with respect to the inner sleeve as much as 100° in either direction from the neutral position without any slipping occurring between the sleeves and the rubber.

In bushings have a flange at one end, this type of construction, wherein the molded rubber insert is held under high radial compression often results in an uneven balance of forces. At the flanged end of the bushing, these forces often cause the insert to work its way out of the sleeves. Furthermore, high stress concentration of the rubber at the interface of the metal often leads to the initiation and propagation of stress cracks resulting in premature failure of the bushing. These cracks would typically develop at the free end of the insert opposite the flange, and would progress through the rubber in an axial direction to the flanged end.

DESCRIPTION OF THE INVENTION

It is an object of the present invention to produce a bushing of the type described herein, including a molded and cured insert radially compressed between a pair of concentric sleeves said bushing designed to give longer service life.

Another object of the present invention is to form a molded annular insert and a flange at one end, the bore through the insert gradually increasing in diameter from the junction of the body and the flange toward the end of the body opposite said flange.

These and other objects are accomplished in the manner to be hereinafter described with particular reference being given to the drawings in which:

FIG. 1 is a cross-sectional view of a molded and cured insert produced according to the teachings of the present invention;

FIG. 2 shows an exploded view of the various components of a typical flanged-end bushing prior to assembly;

FIG. 3 is a cross-sectional view of a first subassembly comprising the insert assembled into an outer metal sleeve;

FIG. 4 represents the next step in the assembly wherein the inner metal is inserted into place; and FIG. 5 is a cross-sectional view of the completed assembly.

According to the teachings of the present invention, the combined forces acting on the elastomeric insert at the end of a flanged-end bushing where crack initiation is most likely to occur are reduced by tapering the bore extending through the body of the insert. The bore is tapered between about 2° and about 10° from a maximum diameter at the free end opposite the flange to a minimum diameter where the bore and the counterbore meet in proximity of the juncture between the body and the flange. In this manner, the radial outward pressure exerted against the end of the outer sleeve by the insert after assembly is not as great as that which exists when using an insert of conventional design having an annular bore of uniform diameter. Furthermore, the combined forces acting upon the insert at the free end of the improved bushing are reduced thus minimizing the opportunity for crack origination and propagation.

Referring now to FIG. 1, there is shown in cross section a molded rubber insert as molded prior to assembly. The insert 1 is composed of a body portion 2 and a radially outwardly extending flange 4 at one end. The outer surface 6 of the body portion defines a surface of revolution and is connected to the free end 8 of the insert by a pair of rounded shoulders 10. An annular bore 12 extends axially through the insert and comprises a first portion 14 of uniform diameter at the free end 8 of the body, and a second portion 16 of tapering diameter extending inwardly therefrom. In the final bushing assembly, the first portion 14 will lie axially beyond the end of the outer sleeve while the tapered second portion 16 will generally underlie this sleeve. This second portion 16 is joined by a beveled surface 18 to a counterbore 20 in the flange 4 of the bushing. The taper of the second portion is generally between about 2° and about 10°, with the maximum diameter near the free end of the insert. It is thus obvious that the thickness of the rubber in the body portion decreases from the flange 4 toward the free end 8.

FIG. 2 shows an exploded view of the various components of a bushing including the molded insert 1, an outer metal sleeve 31 provided with flange 33, an inner metal sleeve 41 of uniform diameter, and a pair of end caps 51, 61. The internal diameter of the outer metal sleeve 31 is between about 10 and about 20 percent less than the outer diameter of the body portion 20 of the molded insert 1. The inner sleeve 41 has a diameter which is about 15 to 30 percent greater than the maximum diameter of the bore 12 through the molded insert. The end caps 51, 61 are provided with an annular cylindrical body 53, 63, adapted to be press-fitted within the inner sleeve 41 at either end thereof, and a radially outwardly extending disc portion 55, 65.

FIG. 3 shows a partially assembled bushing of the type covered by the present invention wherein the insert is radially compressed about 20 percent and is inserted into the outer sleeve 31 until the radial flange 4 of the insert contacts and abuts flange 33. One method by which this is accomplished is through the use of an inwardly tapered cone, the minimum inner diameter of which corresponds to the inner diameter of the sleeve. In the presence of a suitable lubricant, the insert is forced through the cone and into the sleeve. Because the sleeve diameter is less than the molded diameter of the insert, the latter exerts a substantial radial pressure against the sleeve, this pressure serving to hold the insert in place. The radial compression of the insert also causes it to undergo some elongation.

The insert undergoes further compression and elongation when the inner sleeve 41 is pressed into place through the bore 12 of the insert. As shown in FIG. 4, this inner sleeve 41 has an outer diameter which is considerably larger than the bore 12 of the insert in the subassembly, and accordingly distends the insert and radially compresses it even further causing it to undergo additional axial elongation. This causes the insert to fill the entire annular space between the inner and outer sleeves. The axial length of the insert, after assembly, because of the large amount of radial compression, is at least 50 percent, and sometimes as much as 100 percent greater than in its molded condition.

The final step in the assembly is to place the end caps 51, 61 on the ends of the bushing by urging the annular cylindrical body portion 53, 63 into the inner sleeve 41. The completed bushing assembly as shown in FIG. 5, is then ready for use.

As previously mentioned, the tapered internal diameter of the insert results in a more favorable distribution of forces in the assembly thereby decreasing the likelihood of failure of the bushing during use. The following example will serve to illustrate the advantages to be obtained through use of the present invention.

A rubber compound was prepared by blending 100 parts of No. 1 smoked sheet, 40 parts of Channel Carbon Black and small amounts of an appropriate activator, a plasticizer and a retarder in a Banbury to form a master batch. This master batch was then mixed with a curing agent, accelerators and antioxidants to produce a formulation suitable for molding.

A number of rubber inserts generally similar in shape to that shown in FIG. 1 were prepared by injection molding and were then cured at a temperature of 305° F. for 12 minutes in a forced-air furnace to give a product having a hardness of about 60 Durometer. These inserts all had the following approximate dimensions:

| | Inches |
|---|---|
| Axial length | 1.0 |
| Length of body portion | 0.8 |
| Flange thickness | 0.2 |
| Flange outer diameter | 1.36 |
| Diameter of counterbore | 0.675 |
| Outer diameter of body | 1.24 |
| Diameter of bore at flange | 0.5 |
| Diameter of bore at free end | 0.56 |

Taper, 5.7°.

Each of these molded inserts was assembled between an outer sleeve having an axial length of 1.32 inches and an internal diameter of 1.05 inches and an inner metal sleeve 1.69 inches long and having an outer diameter of .69 inch. The metal sleeves which were fabricated from redrawn steel tubes, were thoroughly cleansed and were phosphate coated prior to assembly. This treatment is normally used to provide better bonding with the rubber and to increase the corrosion resistance of the metal components.

The bushing was assembled on a standard vertical assembly machine by first forcing the rubber insert into the outer sleeve and then using a tapered mandrel to feed the inner sleeve into the bore of the insert. In the final assembly, the insert had a length of about 1.6 inches as opposed to the initial axial length of 1.0 inch. The original thickness of rubber in the body portion was about .68 at the free end and about .74 at the end adjacent to the flange. The final thickness of the insert in the assembly was .36 inch. These bushings were allowed to set for at least 24 hours to permit complete absorption of the lubricant into the rubber so that maximum friction could be obtained between the insert and the sleeves. Twenty-four of the bushings were mounted on a life test machine wherein the inner metal was held stationary and the outer metal sleeve was oscillated in an arch of about 60° from a neutral position under a uniform radially imposed load of several hundred pounds. The test was run at room temperature. All of the bushings successfully passed 200,000 cycles, and they averaged almost 325,000 cycles before failure.

An equal number of bushings identical to those above except that the bore through the insert had a constant molded diameter of .53 inch, were assembled and were subjected to the same test. Of course 18 failed before reaching 200,000 cycles. The average life for these 24 bushings was less than 175,000 cycles. It can thus be seen that by the mere expedient of providing a taper as hereinabove described a substantial increase in bushing life is achieved.

The bushing produced according to the teachings of this invention can be used wherever a flanged-end bushing is normally employed. For example, it can be used in the upper control arm of the front suspension of an automobile. Other uses include motor mounts, shock mounts, vibration isolators and the like.

The insert is preferably molded from a natural rubber compound preferably formulated with various additives, the amounts and types being dependent upon the type of service, environmental conditions and other factors surrounding its use. These molded and cured inserts normally have a hardness of between about 40 and about 65 Durometer, dependent upon the amount and types of fillers and oil that are used. They are preferably formed by injection or transfer molding. Synthetic rubber compounds such as neoprene, butyl rubber and others may also be used.

The outer and inner sleeves are typically made of metal. However, plastic and other rigid materials can be used for this purpose. It is not necessary that the outer sleeve be round. Instead, it can be oval or other shape. The bushings of the present invention can be assembled in any of the conventional machines that are normally used for the fabrication of flanged-end bushings. It is customary, although not essential to use a hydrocarbon lubricant to facilitate assembly. It should be noted that an adhesive can be used to bond the insert to either or both of the inner and outer sleeves to further increase the resistance to slipping. It is common practice to use a heat activated cement for this purpose, thus necessitating a heating step following the assembling step. However, other types of cement may also be used.

In many instances, the end caps may be omitted from the bushing assembly without materially affecting the operation thereof. Thus, the bushing shown in FIG. 4 will typify the final assembly.

Other and further modifications can be made in the design and construction of this bushing without deviating from the scope of the invention as delimited by the claims in which we claim:

1. An annular unitary molded and cured elastomeric insert for a resilient bushing of the type comprising an inner rigid cylindrical member, and an outer rigid tubular member having an inner surface defining a uniform cross-sectional volume throughout its length and being concentric with and spaced from said inner member and having a radially outwardly extending flange at one end, said insert composed of an axially extending body portion having a radial flange at one end and an opposite free end, said radial flange adapted to abut the flange of the outer member and an outer periphery extending axially from said flange, said body portion having:
- (a) an axial length less than that of the rigid members,
- (b) an outer diameter uniformly greater than the inner diameter of the outer member and being the same along its entire axial length and
- (c) a bore extending axially therethrough and having a taper which begins from a plane normal to the axis of the bore and adjacent one end of the flange and which increases in diameter toward the opposite free end and wherein the maximum diameter is smaller than the outer diameter of the inner member, and said radial flange having an inner diameter that is greater than the maximum inner diameter of the tapered bore through the body portion, said molded insert undergoing axial elongation and radial compression when assembled between the rigid members.

2. The insert according to claim 1 wherein the taper of the bore is between about 2° and about 10°.

3. The insert according to claim 2 wherein the tapered bore is joined at the free end, to a portion of uniform diameter which, after assembly extends axially beyond the corresponding end of the outer member.

4. A resilient bushing comprising an annular elastomeric insert having a body portion radially compressed between an inner cylindrical sleeve and an outer tubular sleeve member having an inner surface defining a uniform cross-sectional volume throughout its axial length and a radial flange at one end of said body portion in abutting relationship with a corresponding flange at one end of the outer sleeve, the body portion of said insert, as molded having an outer diameter uniformly greater than the inner diameter of the outer member and being the same along its entire axial length and provided with a bore therethrough that tapers from a smaller diameter at the flanged end to a larger diameter at the opposite free end whereby the radially outward pressure exerted by the insert against the outer sleeve is less at the free end than it is at the flanged end.

5. The bushing according to claim 4 wherein the taper of said bore is between about 2° and about 10°.

6. The bushing according to claim 5 wherein said insert is radially compressed between about 40 and about 60% in the final assembly.

References Cited
UNITED STATES PATENTS

| | | | |
|---|---|---|---|
| 2,993,715 | 7/1961 | Hutton | 287—85 |
| 3,230,000 | 11/1966 | Simpson | 287—85 |

DAVID J. WILLIAMOWSKY, Primary Examiner

A. V. KUNDRAT, Assistant Examiner

U.S. Cl. X.R.

64—11